United States Patent
Ardhanari et al.

(10) Patent No.: US 9,288,150 B2
(45) Date of Patent: Mar. 15, 2016

(54) METHOD AND APPARATUS FOR SUPPORTING CLASS OF SERVICE OVER BONDED DIGITAL SUBSCRIBER LINE (DSL) LINKS

(75) Inventors: Guruprasad Ardhanari, Bangalore (IN); Gert Schedelbeck, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 1247 days.

(21) Appl. No.: 13/210,839

(22) Filed: Aug. 16, 2011

(65) Prior Publication Data

US 2012/0044918 A1 Feb. 23, 2012

Related U.S. Application Data

(60) Provisional application No. 61/375,064, filed on Aug. 19, 2010.

(51) Int. Cl.
*H04L 12/851* (2013.01)
*H04L 12/815* (2013.01)
*H04L 12/853* (2013.01)
*H04L 12/801* (2013.01)

(52) U.S. Cl.
CPC ............. *H04L 47/2441* (2013.01); *H04L 47/22* (2013.01); *H04L 47/245* (2013.01); *H04L 47/2408* (2013.01); *H04L 47/2416* (2013.01); *H04L 47/34* (2013.01)

(58) Field of Classification Search
CPC ..... H04L 47/2441; H04L 47/22; H04L 47/34; H04L 47/2416; H04L 47/2408; H04L 47/245
USPC .................................................. 370/412, 338
See application file for complete search history.

(56) References Cited

U.S. PATENT DOCUMENTS

| | | | |
|---|---|---|---|
| 5,497,371 A * | 3/1996 | Ellis et al. ...................... | 370/412 |
| 2006/0028983 A1 * | 2/2006 | Wright .......................... | 370/230 |
| 2006/0187911 A1 * | 8/2006 | Huotari et al. ................ | 370/389 |
| 2009/0219942 A1 * | 9/2009 | Peeters et al. ................. | 370/412 |
| 2011/0078783 A1 * | 3/2011 | Duan et al. ..................... | 726/15 |

* cited by examiner

*Primary Examiner* — Dang Ton
*Assistant Examiner* — Mandish Randhawa

(57) ABSTRACT

Class of service is supported over bonded lines by determining that packets of the same traffic class are to be sent over the same link and sending the packets over the same link without passing the packets through a fragmentation and reassembly layer.

26 Claims, 2 Drawing Sheets

METHOD AND APPARATUS FOR SUPPORTING CLASS OF SERVICE OVER BONDED DIGITAL SUBSCRIBER LINE (DSL) LINKS

PRIORITY CLAIM

This application claims priority from U.S. Provisional Patent Application No. 61/375,064 filed on 19 Aug. 2010, the content of said application is incorporated herein by reference in its entirety.

BACKGROUND

DSL (digital subscriber line) is an access technology used to connect users to a central office (CO) by mapping data to higher frequency components of voice grade copper lines used for basic telephony service. Typically, service providers use this technology to deliver broadband internet connection to home users. In order to effectively support various applications on the DSL link, usually the traffic is segregated into three classes, namely:

Low latency, high priority (e.g. voice)
Low latency, low priority (e.g. video)
High latency (e.g. ftp data)

Current DSL standards have defined two ways of supporting class of service. Low latency and high latency traffic can be split at the TPS-TC (transport protocol specific transmission convergence) layer and mapped to different latency paths of the PMS-TC (Physical media specific transmission convergence) layer. The high latency path in PMS-TC uses a technique called interleaving which results in better impulse noise protection at the cost of higher latency. The low latency path uses smaller interleaving depth or no interleaving at all (and thus lower impulse noise protection) but with the advantage that the latency of transmission is lower.

These two streams can be further split into low and high priority traffic in the TPS-TC layer using a technique called pre-emption. Traffic on the DSL link is transmitted in units of Ethernet packets, if the TPS-TC layer is configured in the Packet Transfer Mode (PTM). When the transmitter is to send a pre-emption packet, and it is in the middle of transmission of a lower priority packet, it is allowed to pause the transmission of the ongoing lower priority packet, transmit the higher priority packet and then resume the lower priority packet transmission. This ensures that the higher priority packet has minimal transmission delay, which comes at a cost of increased transmission delay of the lower priority packet.

Bonding is a technique to aggregate the data rates of two or more DSL links between the CO and same Customer Premises Equipment (CPE). Usually the telephony services company provides two copper lines to its subscribers, one of which is unused and meant for redundancy purposes. These lines can be bonded together to either have higher bandwidth or support longer distance between CO and CPE. The transmission delay and data rate of the bonded links need to be similar in order to reduce the processing complexity of the receiver.

Ethernet packets to be sent on the DSL link are split into smaller fragments before the TPS-TC processing, a sequence identification number (SID) is added to each fragment and then the fragments are sent as regular packets to the per-link TPS-TC function. On the receiver side, the reassembly function receives the fragments from all the TPS-TC functions (one per link), and recreates the original packet sequence from the SIDs of the received fragments.

Pre-emption support is available over bonded links. Logical depiction of the bonding function (also known as Port Aggregation Function i.e. PAF) and the pre-emption function in the relevant standards show that the transmitter first performs the bonding function before the TPS-TC layer and the pre-emption function resides within the TPS-TC layer. Since the bonding function on the receiver side attempts to reconstruct the exact packet sequence that the bonding function on the transmitter side sent, it means traffic classification cannot co-exist with bonding, because classification essentially assumes that the medium is capable of supporting different latencies for different traffic classes, whereas bonding assumes that there is a single traffic class that is transported on different media with similar latencies.

One bonding function can be provided per traffic class to address this problem. However both the transmitter and receiver need additional hardware and computational resources for supporting each instance of the bonding function. Also, bonding increases end-to-end latency, which is not suited for certain traffic classes. A more efficient approach involves limiting the number of bonding function instances and also limiting the latency for certain traffic classes. Another approach is to have dual latency in PMS-TC and bond only one of the two latency paths. The non-bonded latency path could be used for traffic classes that are sensitive to latency. However this approach results in a certain portion of the available bandwidth always being reserved for such applications or traffic classes, irrespective of whether it is required or not.

SUMMARY

The embodiments described herein limit the number of bonding function instances required within CO and CPE and at the same time results in the same number of traffic classes as is possible without bonding. The embodiments described herein also do not reserve bandwidth for any particular traffic class or application and are applicable to various types of systems such as home networking and wireless LAN (local area network) systems.

According to an embodiment of a method for supporting class of service over bonded lines, the method includes: determining that packets of a same traffic class are to be sent over a same link; and sending the packets over the same link without passing the packets through a fragmentation and reassembly layer.

According to an embodiment of a communication device for supporting class of service over bonded lines, the communication device includes one or more engines configured to determine that packets of a same traffic class are to be sent over a same link and send the packets over the same link without passing the packets through a fragmentation and reassembly layer.

According to an embodiment of a method for supporting class of service over bonded lines, the method includes: receiving fragments at a receiver; and configuring the receiver to prevent those fragments having a predetermined sequence identification number from passing through a fragmentation and reassembly layer.

According to an embodiment of a receiver for supporting class of service over bonded lines, the receiver includes one or more engines configured to process received fragments and configure the receiver to prevent those fragments having a predetermined sequence identification number from passing through a fragmentation and reassembly layer.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
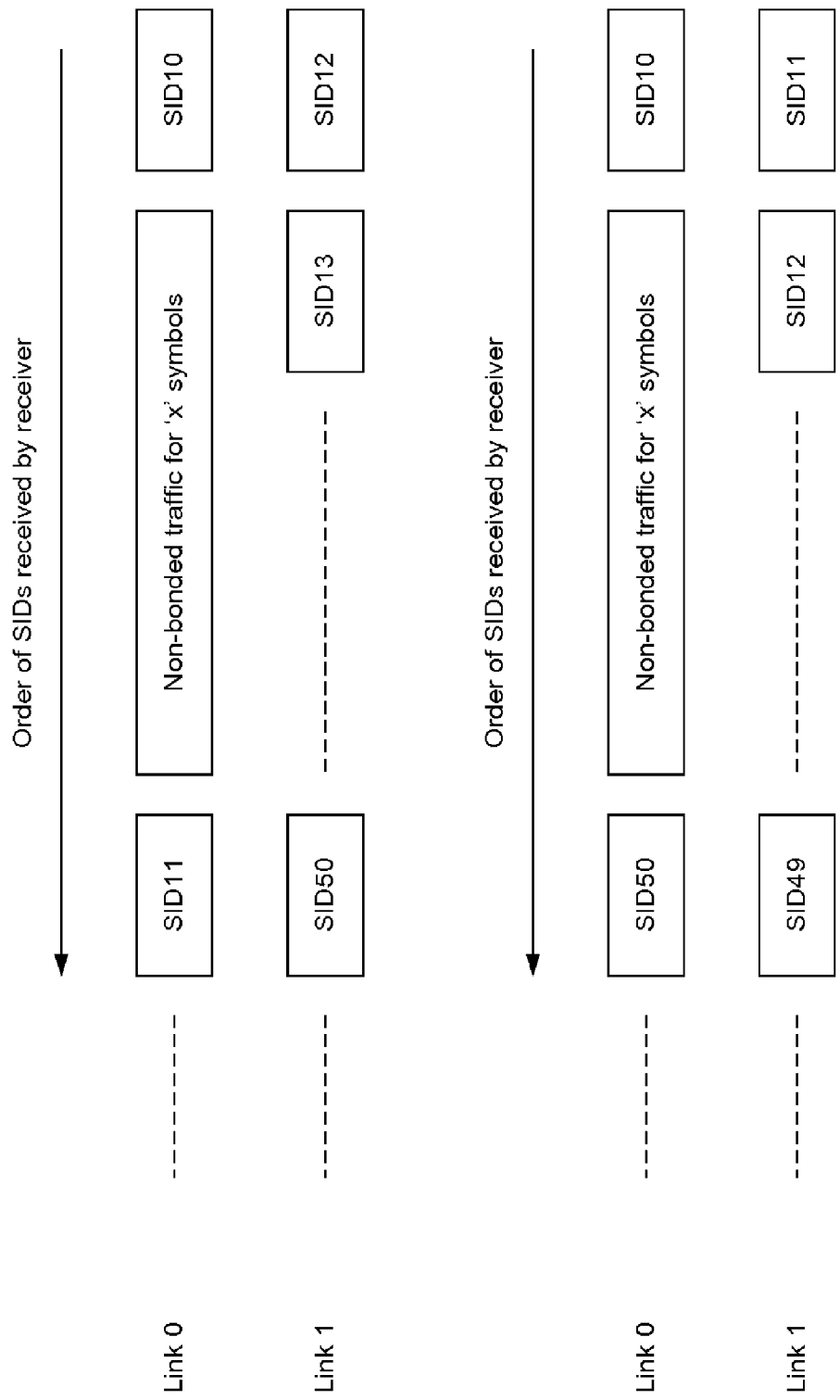
FIG. 1 illustrates methods of supporting class of service over bonded DSL links.

Support for fragmentation and reassembly only arises when parts of the same packet are transmitted over more than one link. If all packets of the same traffic class are sent over the same link, and there is a way for the receiver to distinguish between the traffic classes using the control structures (called TC sync pattern) (embedded in the data stream sent out by the TPS-TC layer, or using special preconfigured SIDs in the bonding header that will not be used for fragmentation and reassembly) then essentially all packets of that traffic class can be sent and received without passing them through the fragmentation and reassembly layers, which is also referred to herein as the 'TO sync pattern' method.

Pre-emption traffic in the non-bonded case is already identifiable by the receiver using unique control structures in the TPS-TC layer as defined in current standards. Such a scheme is required to allow for the pause and restart of the non-preemption data. Therefore, if the transmitter forwards pre-emption data only to one of the links and does not pass it through the fragmentation layer and similarly the receiver identifies pre-emption data and bypasses the reassembly layer only for the preemption data, then effectively two traffic classes (high priority and low priority) can be supported over a single bonding function. Similarly, more traffic classes can be supported by having unique per class identification control structures known to both the transmitter and receiver.

The reassembly layer on the receiver side can be configured to ignore fragments with certain pre-configured SIDs for reassembly purposes and instead use them as traffic class identifiers and pass them on to the next layer after removing the SID and extracting the traffic class information. The transmitter would similarly use these special SIDs to convey the traffic class information of the non-bonded traffic. This method is also referred to herein as the 'SID' method.

One notable difference between the two methods of traffic class differentiation described above is that when using the TC sync pattern method, it is the TPS-TC layer in the receiver that differentiates between the traffic classes, whereas in the SID method, it is the reassembly layer that differentiates between the traffic classes before appending an incoming fragment to the per-PME (Physical Medium Entity) queue. The TC sync pattern method offers slightly better latency for pre-emption or higher priority traffic because of the ability to switch between traffic classes at the TC codeword boundary, whereas for the SID method, the switching happens only at fragment boundaries.

Several factors should be considered with this kind of implementation. For example, the maximum data rate of the traffic class is limited to the maximum data rate of the line to which it is mapped. This seems to contradict the original purpose of having bonding, i.e. increased data rate between the CO and CPE. However this may not be a limiting factor for certain applications (mapped to a traffic class) where the data rate of one of the bonded links is high enough. Also since there are no fragmentation and reassembly delays, this implementation is better suited for latency sensitive applications.

In another example, sending non-bonded traffic on one of the links increases the differential delay of the bonded traffic for the receiver, and thus may increase the complexity due to higher differential delay requirement. The increase in differential delay itself is controllable using a rate shaping mechanism for the non-bonded traffic as described in more detail later herein. In any case, the increased complexity for the receiver with this implementation is not of the same scale as supporting additional bonding groups for individual traffic classes.

In yet another example, if the link that carries the non-bonded traffic drops (i.e. the DSL connection between CO and CPE on that link is broken), then the transmitter should re-assign the stream to any of the other bonded (and active) links. There need not be any handshake procedure between the CO and CPE to shift the traffic stream from one link to another. The decision to map a certain traffic stream to a certain DSL link is purely with the transmitter, and the receiver does not make any assumption about which traffic stream is mapped to which DSL link and at what point in time such a mapping exists. If the transmitter decides to switch the traffic stream from one DSL link to another for reasons other than breakage of the link, the transmitter may have to pause the transmission of the traffic stream during the switching to account for the differential delay between the lines. That is, the possibility of the receiver receiving packets or data of a traffic stream switching from one link to another can be avoided, if the transmitter waits for the "pipe" on the first link to be completely flushed before resuming the transmission of that traffic stream on a new link.

Sending non-bonded traffic over bonded links adds to the differential delay on the bonded traffic at the receiver. In the worst case, if one of the links were to continuously send non-bonded traffic for x symbols, the receiver needs to buffer x symbols of the other links sending bonded traffic (i.e. until the first link resumes bonded traffic). As such the rate at which non-bonded traffic is inserted onto the line should be controlled. For the TC sync pattern method for traffic class differentiation, this rate is controllable in "fine grain" units of, for example, 65 byte TC code words, because the pausing and resumption of traffic belonging to various traffic classes happens at the TC codeword boundaries. Factors that control the rate shaping of the non-bonded traffic classes are the maximum data rate requirement for that traffic class and maximum differential delay the receiver can handle. The implementation of such a rate shaper is implementation specific and not mentioned further herein.

A more "coarse grain" measure to limit the impact on differential delay is to not insert the non-bonded traffic TC codeword between consecutive SIDs on the same link. This method can be used for both ways of conveying the traffic class information.

FIG. 1 illustrates one embodiment of this method. According to this embodiment, the receiver waits for SID 11 on link 0 before continuing with reassembly. In the mean time, x symbols of bonded traffic are received on link 1 and wait in the reassembly buffer of the receiver for SID 11. In the second case, since the receiver does not need to wait for the expected SID, there is no increase in the reassembly buffer requirement. Implementing such a scheme with the TC sync pattern method of conveying traffic class information might require aligning the fragment boundary with the TC codeword boundary. For example, if SID 10 finishes in the middle of a codeword, then the remainder of the codeword needs to be finished with an idle pattern so that the non-bonded traffic can start on the next TC codeword boundary and SID 11 can be sent on link 1. To minimize loss of bandwidth in such cases, the transmitter may decide to insert the non-bonded traffic when the end of fragment of the bonded traffic matches or nearly matches the end of the TC codeword, or the fragment size itself may be adjusted to satisfy this condition.

Figure 2:
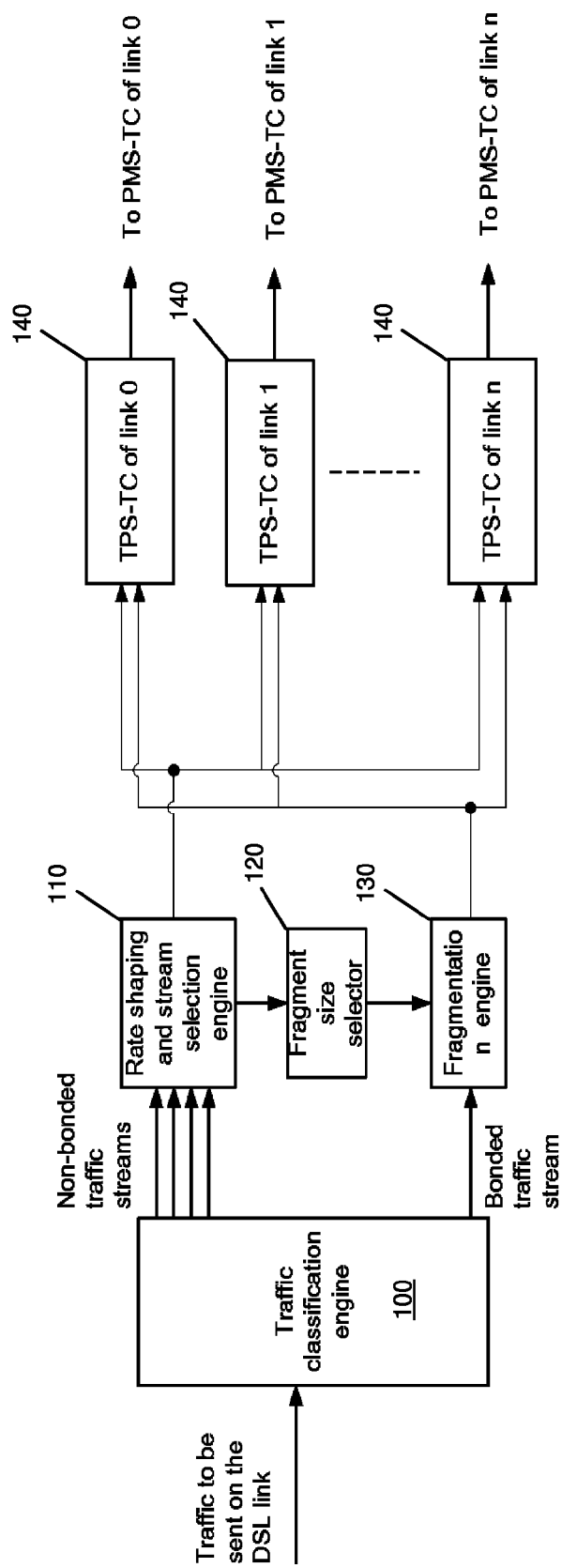
FIG. 2 illustrates a communication device configured to support class of service over bonded DSL links.

FIG. 2 illustrates an embodiment of a system or network which implements the methods described herein. These methods can be implemented at a CO and/or CPE. A classification engine 100 identifies the data streams based on values of certain fields in the Ethernet packet. The output is one or several non-bonding data streams and one bonding data stream. A rate shaping and stream selection engine 110, based on such factors as individual line data rates, maximum data rate for non-bonding streams and length of burst of the non-bonding data stream, decides which link should send the non-bonding stream and how many code words of the non-bonding stream(s) should be sent in a burst. The rate shaping and stream selection engine 110 also decides the mapping of a traffic stream to a DSL link and when to change it. For long bursts of non-bonding traffic and using TC sync pattern for traffic differentiation, a fragment size selector 120 could alter the size of a bonding fragment queued for transmission in order to reduce bandwidth wastage when switching between bonding and non-bonding streams as described above. For shorter bursts of non-bonding traffic, this may not be necessary and the TPS-TC could switch between the bonding and non-bonding streams at the codeword boundary.

A fragmentation engine 130 provides the bonding fragments for individual TPS-TC links to pull out data. The fragmentation engine 130 maintains a queue of fragments, without deciding on which TPS-TC the fragments will be sent out on. Individual TPS-TC modules 140 pull out the fragments from this queue based on their own decision making. The TPS-TC modules 140 multiplex between the bonding and non-bonding streams and make sure the correct control words associated with each stream is inserted in the TC codeword (when using the TC sync pattern method for traffic differentiation). The TPS-TC modules 140 may switch between the two streams at the TC codeword boundary for short bursts of the non-bonding traffic streams, or switch at the fragment boundary if the non-bonding traffic stream is long or when using the SID method for traffic differentiation. Since the TPS-TC modules 140 pull out the fragments only when they are ready to send the bonding traffic, the differential delay problem mentioned in case 1 of FIG. 1 is avoided.

It is possible to support class of service over bonded links, without incurring bonding related latency for delay sensitive applications, without significantly increasing complexity of the transmitter and receiver and without bandwidth loss due to reservation, by mapping a traffic class to only one of bonded links and transmitting it in a controlled fashion. The advantages of mapping a traffic class to only one of the bonded links include: reduced complexity for transmitter and receiver due to reduced bonding groups; reduced latency of transmission for applications that are delay sensitive, due to absence of fragmentation and reassembly latency; and there is no bandwidth reservation for low bandwidth but delay sensitive applications such as voice, yet there is a guaranteed and minimal latency of transmission.

Various modifications to the embodiments described herein can include the following. The class of service for the packets can be distinguished using control structures. Unique control structures in a TPS-TC layer can be used to achieve pre-emption. The receiver can be configured to ignore fragments with predetermined SIDs for reassembly purposes, and the receiver can also use the predetermined SID as a traffic class identifier. The receiver can be configured to pass fragments with the predetermined SID to another layer after the SID is removed and the traffic class identifier is determined. The transmitter or transceiver can be configured to convey a predetermined SID that indicates a traffic class of the non-bonded traffic.

The methods described herein can be applied to latency sensitive applications. A differential delay can be controlled using the rate shaper 110 for either non-bonded and/or bonded traffic. A stream can be reassigned to another link, for example, in the case that a first link is broken or another reason. The transmission of a traffic stream can be paused to account for differential delay between the lines. The transmission rate can be controlled based on either the maximum data rate for that traffic class and/or a maximum differential delay the receiver can handle. Nonbonded traffic TC codewords need not be inserted between consecutive SIDs. The communication device can wait for an SID on a link to continue with reassembly or instead not wait for an SID and continue reassembly. Nonbonded traffic can be inserted when an end fragment matches or nearly matches an end of a TC codeword to minimize loss of bandwidth. The fragment size can be adjusted to minimize loss of bandwidth. Data streams can be classified based on values of certain fields in an Ethernet packet.

Rate shaping can be performed based on line data rates, maximum data rates and/or length of burst of the non-bonding data stream. The communication device can also decide which link should send the non-bonding stream, how many code words should be sent in a burst, and a mapping of traffic stream(s) to a DSL link. The communication device can also decide when to change a mapping of a DSL link and alter a size of the bonding fragment e.g. for long bursts. For shorter bursts, the communication device can switch between bonding and non-bonding at the codeword boundary. Multiplexing can be enabled between bonding and non-bonding streams. Also, the communication device can ensure the correct control words associated with one or more streams is inserted in the TC codeword. The communication device can switch between two streams at a TC codeword boundary.

The communication device can be a transmitter, receiver or transceiver that provides any of the methods described herein. For example the communication device can be a CO or a CPE. The communication device can be implemented as computer readable code stored on a storage medium including disc, RAM, and/or PROM, Flash memory, cache memory, etc. that provides any of the methods described herein.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for supporting class of service over bonded lines, the method comprising:
   determining that packets of a same traffic class are to be sent over a same link; and
   sending the packets over the same link without passing the packets through a fragmentation and reassembly layer, further comprising ensuring nonbonded traffic Transmission Convergence (TC) codewords are not inserted between consecutive sequence identification numbers.

2. The method according to claim 1, further comprising distinguishing the class of service for the packets using control structures.

3. The method according to claim 1, further comprising using unique control structures in a Transport Protocol Specific-Transmission Convergence (TPS-TC) layer to achieve pre-emption.

4. The method according to claim 1, further comprising controlling a rate of transmission of the packets based on 65 byte Transmission Convergence (TC) code words.

5. The method according to claim 1, further comprising controlling a rate of transmission of the packets based on a maximum data rate for the traffic class and/or a maximum differential delay.

6. The method according to claim 1, further comprising inserting nonbonded traffic when an end fragment matches or nearly matches an end of a Transmission Convergence (TC) codeword.

7. The method according to claim 1, further comprising classifying data streams based on values of one or more fields in an Ethernet packet.

8. The method according to claim 1, further comprising performing rate shaping based on line data rates, maximum data rates and/or length of burst of a non-bonding data stream.

9. The method according to claim 1, further comprising deciding which link should send a non-bonding data stream.

10. The method according to claim 1, further comprising switching between bonding and non-bonding at a codeword boundary.

11. The method according to claim 1, further comprising multiplexing between bonding and non-bonding data streams.

12. The method according to claim 1, further comprising directing non-bonded traffic streams to a particular link and bonded traffic streams to the fragmentation and reassembly layer.

13. The method according to claim 1, further comprising preventing fragments with predetermined sequence identification numbers from passing through the fragmentation and reassembly layer.

14. The method according to claim 1, further comprising configuring a transmitter or transceiver to convey a predetermined sequence identification number that indicates the traffic class of the packets.

15. A communication device for supporting class of service over bonded lines, the communication device comprising one or more engines configured to:
   determine that packets of a same traffic class are to be sent over a same link; and
   send the packets over the same link without passing the packets through a fragmentation and reassembly layer,
   wherein the one or more engines are further configured to ensure nonbonded traffic Transmission Convergence (TC) codewords are not inserted between consecutive sequence identification numbers.

16. The communication device according to claim 15, wherein the one or more engines are further configured to distinguish the class of service for the packets using control structures.

17. The communication device according to claim 15, wherein the one or more engines are further configured to perform rate shaping based on line data rates, maximum data rates and/or length of burst of a non-bonding data stream.

18. The communication device according to claim 15, wherein the one or more engines are further configured to adjust fragment size to reduce bandwidth loss.

19. The communication device according to claim 15, wherein the communication device is an xDSL, home networking or wireless LAN communication device.

20. A method for supporting class of service over bonded lines, comprising:
   receiving fragments at a receiver; and
   configuring the receiver to prevent those fragments having a predetermined sequence identification number from passing through a fragmentation and reassembly layer, and to use sequence identification numbers of fragments having a sequence identification other than the predetermined sequence identification numbers for reassembly at the fragmentation and reassembly layer
   configuring the receiver to ensure nonbonded traffic Transmission Convergence (TC) codewords are not inserted between consecutive sequence identification numbers.

21. The method according to claim 20, further comprising determining a traffic class identifier from the predetermined sequence identification number.

22. The method according to claim 21, further comprising removing the predetermined sequence identification number and passing the fragments with the predetermined sequence identification number to a layer other than the fragmentation and reassembly layer after the predetermined sequence identification number is removed and the traffic class identifier is determined.

23. A receiver for supporting class of service over bonded lines, the receiver comprising one or more engines configured to:
   process received fragments to prevent those fragments having a predetermined sequence identification number from passing through a fragmentation and reassembly layer, and to use sequence identification numbers of fragments having a sequence identification other than the predetermined sequence identification numbers for reassembly at the fragmentation and reassembly layer
   and further configured to ensure nonbonded traffic Transmission Convergence (TC) codewords are not numbers.

24. The receiver according to claim 23, wherein the one or more engines are further configured to determine a traffic class identifier from the predetermined sequence identification number.

25. The receiver according to claim 24, wherein the one or more engines are further configured to remove the predetermined sequence identification number and pass the fragments with the predetermined sequence identification number to a layer other than the fragmentation and reassembly layer after the predetermined sequence identification number is removed and the traffic class identifier is determined.

26. The receiver according to claim 23, wherein the receiver is included in an xDSL, home networking or wireless LAN communication device.

* * * * *